United States Patent
Cheng et al.

(10) Patent No.: US 11,641,661 B2
(45) Date of Patent: **\*May 2, 2023**

(54) METHODS AND APPARATUSES FOR DETERMINING QUASI CO-LOCATION (QCL) ASSUMPTIONS FOR BEAM OPERATIONS

(71) Applicant: Hannibal IP LLC, Frisco, TX (US)

(72) Inventors: Chien-Chun Cheng, Taipei (TW); Tsung-Hua Tsai, Taipei (TW); Yu-Hsin Cheng, Taipei (TW); Wan-Chen Lin, Taipei (TW)

(73) Assignee: Hannibal IP LLC, Frisco, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/313,283

(22) Filed: May 6, 2021

(65) Prior Publication Data
US 2021/0258946 A1    Aug. 19, 2021

Related U.S. Application Data

(63) Continuation of application No. 16/660,726, filed on Oct. 22, 2019, now Pat. No. 11,057,896.
(Continued)

(51) Int. Cl.
*H04W 72/04*     (2009.01)
*H04W 72/51*     (2023.01)
(Continued)

(52) U.S. Cl.
CPC .............. *H04W 72/51* (2023.01); *H04L 5/005* (2013.01); *H04L 5/0032* (2013.01); *H04W 72/044* (2013.01); *H04W 72/23* (2023.01)

(58) Field of Classification Search
CPC ............. H04W 72/048; H04W 72/044; H04W 72/042; H04L 5/005; H04L 5/0032; H04L 5/0098; H04L 5/0007; H04L 5/0053
See application file for complete search history.

(56) References Cited

U.S. PATENT DOCUMENTS 11,057,896 B2    7/2021  Cheng et al.
2019/0174466 A1*  6/2019  Zhang ................... H04L 5/0057
(Continued)

FOREIGN PATENT DOCUMENTS

CN    108111286    6/2018
CN    113039740    6/2021
(Continued)

OTHER PUBLICATIONS

ZTE Maintenance for beam management; RI-1808196 3GPP TSG RAN WGI Meeting #94,Aug. 24, 2018(Aug. 24, 2018), sections 2-4 (Year: 2018).*

(Continued)

*Primary Examiner* — Afshawn M Towfighi
(74) *Attorney, Agent, or Firm* — Marcella M. Bodner; Cole Schotz, P.C.

(57) ABSTRACT

A method and a User Equipment (UE) for beam operations are provided. The method includes monitoring at least one of a plurality of Control Resource Sets (CORESETs) configured for the UE within an active Bandwidth Part (BWP) of a serving cell in a time slot; and applying a first Quasi Co-Location (QCL) assumption of a first CORESET of a set of one or more of the monitored at least one of the plurality of CORESETs to receive a Downlink (DL) Reference Signal (RS), wherein the first CORESET is associated with a monitored search space configured with a lowest CORESET Identity (ID) among the set of one or more of the monitored at least one of the plurality of CORESETs.

16 Claims, 6 Drawing Sheets

Related U.S. Application Data

(60) Provisional application No. 62/754,165, filed on Nov. 1, 2018.

(51) Int. Cl.
*H04L 5/00* (2006.01)
*H04W 72/044* (2023.01)
*H04W 72/23* (2023.01)

(56) References Cited

U.S. PATENT DOCUMENTS

2019/0190582 A1* 6/2019 Guo .................. H04W 72/046
2019/0349964 A1* 11/2019 Liou .................. H04L 5/001
2020/0145982 A1 5/2020 Cheng et al.

FOREIGN PATENT DOCUMENTS

| EP | 3874668 | 9/2021 |
|---|---|---|
| IN | 202147019446 | 4/2021 |
| JP | 2022506048 | 1/2022 |
| KR | 20210076989 | 6/2021 |
| WO | 2018016907 | 1/2018 |
| WO | 2020088295 | 5/2020 |

OTHER PUBLICATIONS

ZTE Simultaneous transmission and reception of different channels and reference signals; RI-1805830 3GPP TSG RAN WGI Meeting #93, May 25, 2018 (May 25, 2018), section 2.
VIVO Maintenance for beam management; RI-1810366 3 GPP TSG RAN WGI#94b, Oct. 12, 2018 (Oct. 12, 2018), section 2-3.
ZTE Maintenance for beam management; RI-1808196 3GPP TSG RAN WGI Meeting#94, Aug. 24, 2021(24.08.201*.
Ericsson, "Feature lead summary for beam management", 3GPP TSG-RAN WG1 Meeting #94, 2018, Tdoce R1-1809864, pp. 1-26, Gothenburg, Sweden.
Notice of Reasons for Refusal issued by Japanese Patent Office for corresponding Japanese Patent Application on May 31, 2022.
Examination Report issued by Indian Patent Office for corresponding Indian Patent Application No. 202147019446, dated Feb. 14, 2022.
International Search Report for International Patent Application No. PCT/CN2019/112403, dated Jan. 23, 2020.
Written Opinionfor International Patent Application No. PCT/CN2019/112403, dated Jan. 23, 2020.
International Preliminary Report on Patentability for International Patent Application No. PCT/CN2019/112403, dated Apr. 27, 2021.
Notice of Allowance for U.S. Appl. No. 16/660,726, dated Feb. 24, 2021.
Issue Notification for U.S. Appl. No. 16/660,726, dated Jun. 16, 2021.
Communication pursuant to Rules 70(2) and 70a(2) EPC dated Jul. 7, 2022 for European Application No. 19880818.0.
Extended European Search Report dated Jun. 20, 2022 for corresponding European Patent Application No. 19880818.0.
Final Rejection issued by the Korean Intellectual Property Office dated Nov. 23, 2022 in connection with corresponding Korean Patent Application No. 10-2021-7016222 (Partial Translation).
IntelCorporation, "Remaining Issues on Beam Management," 3GPP Draft; R1-1810751, Sep. 29, 2018, Sections 2.1 and 2.2, pp. 1-15, XP051518155. (Retrieved from Internet by EPO Aug. 11, 2018).
ZTE, "Maintenance for Reference Signals and QCL," 3GPP Draft; R1-1808197, Aug. 11, 2018, Section 2.6, XP051515582. (Retrieved from Internet by EPO Aug. 11, 2018).
LG Electronics, "Remaining Issue on Downlink Control Channel," 3GPP Draft, R1-1808490, Section 2.6, pp. 1-9, XP051515868. (Retrieved from Internet by EPO Aug. 11, 2018).
Nokia, et al., "Feature Lead Summary on QCL," 3GPP Draft, R1-1809758, p. 9, XP051517119. (Retrieved from Internet by EPO Aug. 22, 2018).
Vivo, "On the search space of cross carrier scheduling", #GPP TSG-RAN WGS Meeting # 103bis, R2-1814188, Oct. 12, 2018, pp. 1-7, Chengdu, China.
Notice of Preliminary Rejection dated Oct. 1, 2022 for corresponding Korean Patent Application No. 10-2021-7016222 (partial translation).
Notification for Reasons for Refusal dated Jan. 10, 2023 for corresponding Japanese Patent Apllication No. 2021-523200.

* cited by examiner

METHODS AND APPARATUSES FOR DETERMINING QUASI CO-LOCATION (QCL) ASSUMPTIONS FOR BEAM OPERATIONS

CROSS-REFERENCE TO RELATED APPLICATION(S)

The present application is a continuation application of U.S. patent application Ser. No. 16/660,726, which claims the benefit of and priority to a provisional U.S. Patent Application Ser. No. 62/754,165 filed on Nov. 1, 2018, entitled "Method and Apparatus for Spatial QCL assumptions with Overlapped CORESETs". The contents of all above-named applications are fully incorporated herein by reference for all purposes.

FIELD

The present disclosure generally relates to wireless communications, and more particularly, to methods and apparatuses for beam operations.

BACKGROUND

The next generation (e.g., Fifth Generation (5G) New Radio (NR)) wireless communication system may utilize beamforming technologies to provide directional communications. For example, a User Equipment (UE) may perform beam operations to switch its beam(s) to transmit or receive channels or resources. Each beam the UE applies may be considered as a spatial domain filter that is determined by a corresponding QCL assumption.

However, current specifications for the next generation wireless communication system may cause a UE to perform unfavorable beam switching when the UE is configured with multiple Control Resource Sets (CORESETs). In addition, although the next generation wireless communication system enables utilizing a flexible resource allocation scheme, a UE is likely unable to decide which QCL assumption to use due to the ambiguity of the current specifications for the next generation wireless communication system.

Therefore, there is a need in the art for methods and apparatuses of determining QCL assumptions for beam operations when multiple CORESETs are configured to a UE.

SUMMARY

The present disclosure is directed to methods and apparatuses for beam operations.

According to an aspect of the present disclosure, a UE is provided. The UE includes one or more non-transitory computer-readable media having computer-executable instructions embodied thereon and at least one processor coupled to the one or more non-transitory computer-readable media. The at least one processor is configured to execute the computer-executable instructions to monitor at least one of multiple CORESETs configured for the UE within an active BWP of a serving cell in a time slot, and apply a first QCL assumption of a first CORESET of a set of one or more monitored CORESETs to receive a Downlink (DL) Reference Signal (RS). The first CORESET may be associated with a monitored search space configured with a lowest CORESET Identity (ID) among the set of one or more monitored CORESETs.

According to another aspect of the present disclosure, a UE is provided. The UE includes one or more non-transitory computer-readable media having computer-executable instructions embodied thereon and at least one processor coupled to the one or more non-transitory computer-readable media. The at least one processor is configured to execute the computer-executable instructions to monitor at least one of multiple CORESETs configured for the UE within an active BWP of a serving cell in a time slot, receive Downlink Control Information (DCI) scheduling a Physical Downlink Shared Channel (PDSCH) from a Physical Downlink Control Channel (PDCCH), and apply a QCL assumption for reception of the PDCCH to receive the PDSCH, when a scheduling offset between a last symbol of the PDCCH carrying the DCI and a first symbol of the PDSCH is less than a threshold. The PDCCH may be transmitted in one of a set of one or more monitored CORESETs, and the one of the set of one or more monitored CORESETs may be associated with a monitored search space configured with a lowest CORESET ID among the set of one or more monitored CORESETs.

According to another aspect of the present disclosure, a method of wireless communications is provided. The method includes monitoring, by a UE, at least one of multiple CORESETs configured for the UE within an active BWP of a serving cell in a time slot, and applying, by the UE, a first QCL assumption of a first CORESET of the set of one or more monitored CORESETs to receive a DL RS. The first CORESET may be associated with a monitored search space configured with a lowest CORESET ID among the set of one or more monitored CORESETs.

BRIEF DESCRIPTION OF THE DRAWINGS

Aspects of the present disclosure are best understood from the following detailed description when read with the accompanying figures. Various features are not drawn to scale. Dimensions of various features may be arbitrarily increased or reduced for clarity of discussion.

DETAILED DESCRIPTION

Figure 1:
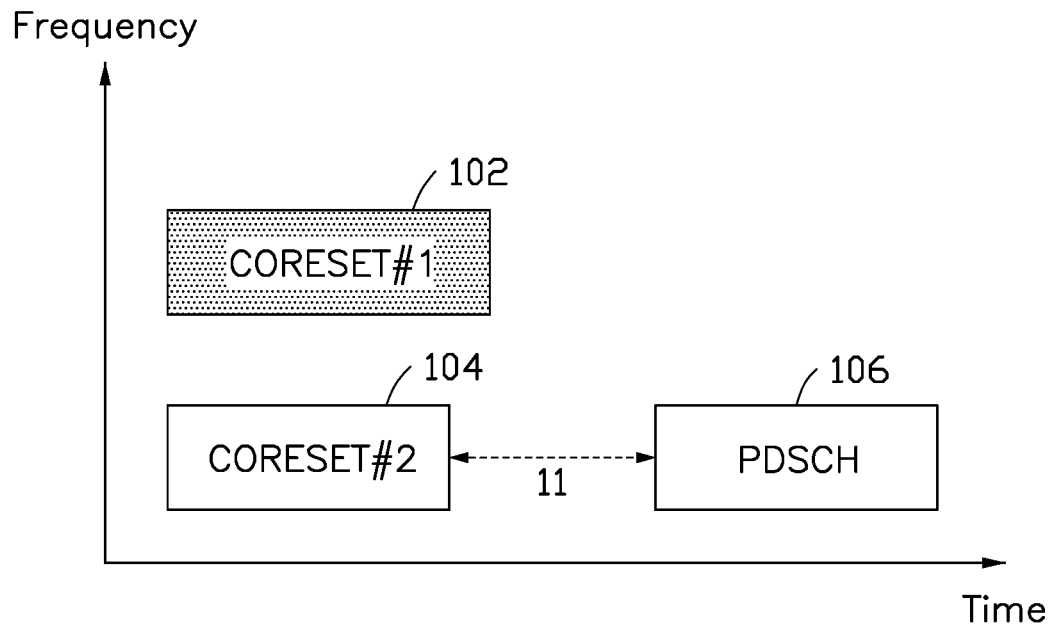
FIG. 1 is a schematic diagram illustrating multiple CORESETs configured for a UE, in accordance with an example implementation of the present disclosure.

The following description contains specific information pertaining to example implementations in the present disclosure. The drawings in the present disclosure and their accompanying detailed description are directed to merely example implementations. However, the present disclosure is not limited to merely these example implementations. Other variations and implementations of the present disclosure will occur to those skilled in the art. Unless noted otherwise, like or corresponding elements among the figures may be indicated by like or corresponding reference numerals. Moreover, the drawings and illustrations in the present disclosure are generally not to scale and are not intended to correspond to actual relative dimensions.

For the purpose of consistency and ease of understanding, like features may be identified (although, in some examples, not shown) by the same numerals in the example figures. However, the features in different implementations may be differed in other respects, and thus shall not be narrowly confined to what is shown in the figures.

The description uses the phrases "in one implementation," or "in some implementations," which may each refer to one or more of the same or different implementations. The term "coupled" is defined as connected, whether directly or indirectly through intervening components, and is not necessarily limited to physical connections. The term "comprising," when utilized, means "including, but not necessarily limited to"; it specifically indicates open-ended inclusion or membership in the so-described combination, group, series and the equivalent. The expression "at least one of A, B and C" or "at least one of the following: A, B and C" means "only A, or only B, or only C, or any combination of A, B and C."

Additionally, for the purposes of explanation and non-limitation, specific details, such as functional entities, techniques, protocols, standard, and the like are set forth for providing an understanding of the described technology. In other examples, detailed description of well-known methods, technologies, systems, architectures, and the like are omitted so as not to obscure the description with unnecessary details.

Persons skilled in the art will immediately recognize that any network function(s) or algorithm(s) described in the present disclosure may be implemented by hardware, software or a combination of software and hardware. Described functions may correspond to modules which may be software, hardware, firmware, or any combination thereof. The software implementation may comprise computer executable instructions stored on computer readable medium such as memory or other type of storage devices. For example, one or more microprocessors or general-purpose computers with communication processing capability may be programmed with corresponding executable instructions and carry out the described network function(s) or algorithm(s). The microprocessors or general-purpose computers may be formed of Applications Specific Integrated Circuitry (ASIC), programmable logic arrays, and/or using one or more Digital Signal Processor (DSPs). Although some of the example implementations described in this specification are oriented to software installed and executing on computer hardware, nevertheless, alternative example implementations implemented as firmware or as hardware or combination of hardware and software are well within the scope of the present disclosure.

The computer readable medium includes but is not limited to Random Access Memory (RAM), Read Only Memory (ROM), Erasable Programmable Read-Only Memory (EPROM), Electrically Erasable Programmable Read-Only Memory (EEPROM), flash memory, Compact Disc Read-Only Memory (CD-ROM), magnetic cassettes, magnetic tape, magnetic disk storage, or any other equivalent medium capable of storing computer-readable instructions.

A radio communication network architecture (e.g., a Long Term Evolution (LTE) system, an LTE-Advanced (LTE-A) system, an LTE-Advanced Pro system, or a 5G New Radio (NR) Radio Access Network (RAN)) typically includes at least one Base Station (BS), at least one User Equipment (UE), and one or more optional network elements that provide connection towards a network. The UE communicates with the network (e.g., a Core Network (CN), an Evolved Packet Core (EPC) network, an Evolved Universal Terrestrial Radio Access Network (E-UTRAN), a 5G Core (5GC), or an internet), through a RAN established by one or more BSs.

It should be noted that, in the present application, a UE may include, but is not limited to, a mobile station, a mobile terminal or device, a user communication radio terminal. For example, a UE may be a portable radio equipment, which includes, but is not limited to, a mobile phone, a tablet, a wearable device, a sensor, a vehicle, or a Personal Digital Assistant (PDA) with wireless communication capability. The UE is configured to receive and transmit signals over an air interface to one or more cells in a radio access network.

A BS may be configured to provide communication services according to at least one of the following Radio Access Technologies (RATs): Worldwide Interoperability for Microwave Access (WiMAX), Global System for Mobile communications (GSM, often referred to as 2G), GSM Enhanced Data rates for GSM Evolution (EDGE) Radio Access Network (GERAN), General Packet Radio Service (GPRS), Universal Mobile Telecommunication System (UMTS, often referred to as 3G) based on basic Wideband-Code Division Multiple Access (W-CDMA), High-Speed Packet Access (HSPA), LTE, LTE-A, eLTE (evolved LTE, e.g., LTE connected to 5GC), NR (often referred to as 5G), and/or LTE-A Pro. However, the scope of the present application should not be limited to the above-mentioned protocols.

A BS may include, but is not limited to, a node B (NB) as in the UMTS, an evolved Node B (eNB) as in the LTE or LTE-A, a Radio Network Controller (RNC) as in the UMTS, a Base Station Controller (BSC) as in the GSM/GERAN, a ng-eNB as in an Evolved Universal Terrestrial Radio Access (E-UTRA) BS in connection with the 5GC, a next generation Node B (gNB) as in the 5G-RAN, and any other apparatus capable of controlling radio communication and managing radio resources within a cell. The BS may serve one or more UEs through a radio interface.

The BS is operable to provide radio coverage to a specific geographical area using a plurality of cells forming the radio access network. The BS supports the operations of the cells. Each cell is operable to provide services to at least one UE within its radio coverage. More specifically, each cell (often referred to as a serving cell) provides services to serve one or more UEs within its radio coverage (e.g., each cell schedules the Downlink (DL) and optionally uplink resources to at least one UE within its radio coverage for DL and optionally uplink packet transmissions). The BS can communicate with one or more UEs in the radio communication system through the plurality of cells. A cell may allocate Sidelink (SL) resources for supporting Proximity Service (ProSe) or Vehicle to Everything (V2X) service. Each cell may have overlapped coverage areas with other cells.

As discussed above, the frame structure for NR is to support flexible configurations for accommodating various next generation (e.g., 5G) communication requirements, such as Enhanced Mobile Broadband (eMBB), Massive Machine Type Communication (mMTC), Ultra-Reliable and Low-Latency Communication (URLLC), while fulfilling high reliability, high data rate and low latency requirements. The Orthogonal Frequency-Division Multiplexing (OFDM) technology as agreed in the $3^{rd}$ Generation Partnership Project (3GPP) may serve as a baseline for NR waveform. The scalable OFDM numerology, such as the adaptive sub-carrier spacing, the channel bandwidth, and the Cyclic Prefix (CP) may also be used. Additionally, two coding schemes are considered for NR: (1) Low-Density Parity-Check (LDPC) code and (2) Polar Code. The coding scheme adaption may be configured based on the channel conditions and/or the service applications.

Moreover, it is also considered that in a transmission time interval TX of a single NR frame, a DL transmission data, a guard period, and an Uplink (UL) transmission data should at least be included, where the respective portions of the DL transmission data, the guard period, the UL transmission data should also be configurable, for example, based on the network dynamics of NR. In addition, SL resources may also be provided in an NR frame to support ProSe services or V2X services.

In addition, the terms "system" and "network" herein may be used interchangeably. The term "and/or" herein is only an association relationship for describing associated objects, and represents that three relationships may exist. For example, A and/or B may indicate that: A exists alone, A and B exist at the same time, or B exists alone. In addition, the character "/" herein generally represents that the former and latter associated objects are in an "or" relationship.

In some implementations, a UE may perform the following processes to determine a default PDSCH beam when multiple search spaces are overlapped in the time domain:

for a UE that monitors multiple search spaces associated with different CORESETs, for a single cell operation or for an operation with Carrier Aggregation (CA) in the same frequency band, if the monitoring occasions of the search space are overlapped in the time domain and the search spaces are associated with different CORESETs having different Quasi Co-Location (QCL)-TypeD properties, the UE may monitor the search spaces associated with a given CORESET containing a Common Search Space (CS S) in the active DL BWP in the serving cell with the lowest serving cell index and any other CORESET associated with the same QCL-TypeD properties as the given CORESET, if two or more CORESETs contain the CSS, the UE may select the CORESET containing the search space having the lowest search space ID in the monitoring occasions in the active DL BWP in the serving cell with the lowest serving cell index, and if none of the CORESETs contains the CSS, the UE may select the CORESET containing the search space having the lowest search space ID in the monitoring occasions in the active DL BWP in the serving cell with the lowest serving cell index.

For this purpose, the QCL assumption with respect to the Synchronization Signal Block (SSB) and the QCL assumption with respect to the Channel Status Information-Reference Signal (CSI-RS) (or Tracking Reference Signal (TRS)) may be considered as two different QCL assumptions, even if the CSI-RS is sourced from the same SSB. The QCL assumption may be based on different parameters, such as the spatial-domain QCL parameters (e.g., QCL TypeD parameter), or the QCL parameters obtained based on at least one of the average delay, the delay spread, the Doppler shift, and the Doppler spread.

In addition, the UE may perform the process described below:

if the scheduling offset between the reception of the DL DCI and the corresponding PDSCH (e.g., which means a time interval between the last symbol of the PDCCH carrying the DCI and the first symbol of the PDSCH) is less than a threshold (e.g., Threshold-Sched-Offset), the UE may assume that the Demodulation-Reference Signal (DM-RS) ports of the PDSCH of a serving cell are quasi co-located with the RS(s) in the Transmission Configuration Indication (TCI) state with respect to the QCL assumption(s) used for the PDCCH QCL indication of the lowest CORESET ID in the latest slot in which one or more CORESETs within the active BWP of the serving cell are configured for the UE.

In this manner, if the QCL assumption of the DM-RSs of a PDSCH is different from that of the DM-RSs of a PDCCH overlapping the PDSCH in at least one symbol in the time domain, the UE may be expected to prioritize the reception of the PDCCH associated with that CORESET. This may also apply to the intra-band CA case (e.g., the PDSCH and the CORESET are in different Component Carriers (CCs)).

In some of the present implementations, a UE may be configured with multiple CORESETs, but not all of them may be monitored by the UE. For example, if a UE is configured with two CORESETs that overlap each other in at least one symbol (e.g., an OFDM symbol) in the time domain, the UE may select one of the CORESETs to monitor based on certain priority rule(s) or pre-configuration(s).

In some of the present implementations, the UE may prioritize and monitor a CORESET if the monitored CORESET is associated with a CSS and the lowest search space ID. By contrast, a non-monitored CORESET may be a CORESET that is associated with a non-monitored search space configuration, for example, due to QCL-TypeD conflicts. The non-monitored CORESET may be configured on a deactivated BWP, on a deactivated Secondary Cell (SCell), or on the same active BWP of a serving cell as other monitored CORESET(s). In some other implementations, the non-monitored CORESET may contain a PDCCH that overlaps with at least one Resource Element (RE) corresponding to a Synchronization Signal (SS)/Physical Broadcast Channel (PBCH) block. In some other implementations, the non-monitored CORESET may be a CORESET configured for a UE that operates under a Discontinuous Reception (DRX) mode.

Non-Monitored CORESET for a Default PDSCH Beam

In some implementations, a non-monitored CORESET may be used for a beam indication for receiving a PDSCH when the non-monitored CORESET has the lowest CORESET ID among the configured CORESETs.

For example, if the scheduling offset between the reception of the DL DCI and the corresponding PDSCH is less than a threshold (e.g., Threshold-Sched-Offset), the UE may assume that the DM-RS ports of the PDSCH may be quasi co-located with the RS(s) in the TCI state with respect to the QCL assumption(s). The QCL assumption(s) may be used for a PDCCH QCL indication (e.g., CORESET) with the lowest CORESET ID in the latest slot, where one or more CORESETs, in the latest slot, within the active BWP of the serving cell are configured for the UE.

FIG. 1 is a schematic diagram illustrating multiple CORESETs configured for a UE, in accordance with example implementations of the present disclosure. As shown in FIG. 1, the UE is configured with two CORESETs, CORESET #1 102 and CORESET #2 104, overlapping in at least one symbol in the time domain. The UE may receive DCI from CORESET #2 104 to schedule PDSCH 106. CORESET #1 102 may not be monitored by the UE due to, for example, priority rules (e.g., CORESET #1 102 is not configured with a CSS, and/or is associated with a non-monitored search space having the lowest search space ID). The non-monitored search space may have the lowest search space ID among those search spaces overlapping this non-monitored search space. For example, if CORESET #1 102 is associated with a non-monitored search space that is configured with a first search space ID, and CORESET #2 104 is associated with a monitored search space that is configured with a second search space ID, the first search space ID may be lower than the second search space ID.

Currently, assuming that CORESET #1 102 has the lowest CORESET ID, if the scheduling offset 11 between CORESET #2 104 and the corresponding PDSCH 106 is less than a threshold (e.g., Threshold-Sched-Offset), an RX beam which is determined by the TCI state of CORESET #1 102 may be required to be used to receive PDSCH 106. In this case, the UE is forced to use different RX beams for CORESET #2 104 and PDSCH 106 in order to follow the 3GPP specification. This type of beam switching, however, is undesirable and needs to be prevented.

Case 1.1

In some of the present implementations, the CORESET having the lowest CORESET ID may not be taken as a non-monitored CORESET. In such a case, if the monitoring occasions of the search space are overlapped in the time domain and the search spaces are associated with different CORESETs having different QCL-TypeD properties, the UE may select the CORESET having the lowest CORESET ID in the monitoring occasions in the active DL BWP of a serving cell with the lowest serving cell index. Any overlapped search space(s) associated with the CORESET(s) having the same QCL-TypeD parameter may be monitored.

In some other implementations, the UE may select the following CORESETs to monitor according to a predefined priority order (from high priority to low priority):

1) CORESET associated with a CSS;
2) CORESET associated with a search space having the lowest search space ID; and
3) CORESET containing the lowest CORESET ID.

This priority rule may be used for determining the QCL assumptions of the RX beams when two or more CORESETs are overlapped in the time domain.

Case 1.2

In some of the present implementations, to avoid unfavorable beam switching, the non-monitored CORESETs may be transparent to the UE. For example, if the scheduling offset between the reception of the DL DCI and the corresponding PDSCH is less than a threshold (e.g., Threshold-Sched-Offset), the UE may assume that the DM-RS ports of the PDSCH are quasi co-located with the RS(s) in the TCI state with respect to the QCL assumption(s). The QCL assumption(s) may be used for a monitored PDCCH QCL indication with the lowest CORESET ID in the latest slot, where one or more CORESETs, in the latest slot, within the active BWP of the serving cell are configured for the UE.

In this case, the non-monitored PDCCH/CORESET may not be used for the QCL assumption for reception of the scheduled PDSCH.

In some of the present implementations, a PDCCH is a monitored PDCCH when a UE prioritizes to monitor the search space(s) associated with a given CORESET (containing the monitored PDCCH) in an active DL BWP of a serving cell having the lowest serving cell index. This UE may be configured to monitor multiple search spaces associated with different CORESETs (e.g., for a single cell operation or for an operation with CA in the same frequency band).

Case 1.3

In some of the present implementations, a non-monitored CORESET may be treated as a non-configured CORESET by a UE. For example, an RRC configuration for a CORESET may not be used for other purposes when the UE does not monitor the CORESET, but the RRC configuration may still be stored by the UE and become valid again when there is no collision between two or more CORESETs in the subsequent time slots. An example of the UE's operation is described below:

for a UE that monitors multiple search spaces associated with different CORESETs, for a single cell operation or for an operation with CA in the same frequency band,
  if the monitoring occasions of the search spaces are overlapped in the time domain and the search spaces are associated with different CORESETs having different QCL-TypeD properties, and the search spaces are not monitored by the UE,
    the CORESETs that UE does not monitor are transparent to the UE, and treated as blank REs in the corresponding slots; or
  at least, the CORESETs that the UE does not monitor may not be used for beam-indication or QCL-indication purposes.

In some of the present implementations, the UE may maintain and store the RRC configuration of the non-monitored CORESET(s). This RRC configuration may be updated via MAC-CE(s) and/or DCI.

In some other implementations, the UE may release the RRC configuration for the non-monitored CORESET(s). The released RRC configuration may not be updated or stored by the UE.

Case 1.4

Currently, there is no clear wording on a non-monitored CORESET whether its QCL assumption should be maintained, be invalidated, or be overridden by the overlapped monitored CORESET. Example solutions for this issue are described below as different cases.

Case 1.4.1

In Case 1.4.1, the UE may store and maintain the QCL assumption of the non-monitored CORESET. An example of the UE's operation is described below:

For a UE that monitors multiple search spaces associated with different CORESETs, for a single cell operation or for an operation with CA in the same frequency band,
  if the monitoring occasions of the search spaces are overlapped in the time domain and one or more search spaces are not monitored by the UE,
    the UE may store and maintain the QCL assumption for the non-monitored CORESET(s).

In some of the present implementations, the QCL assumption of the non-monitored CORESET may be updated via a MAC-CE and/or the DCI.

In some of the present implementations, the QCL assumption of the non-monitored CORESET may be used if the UE supports multiple RX beams.

In some of the present implementations, the QCL assumption of the non-monitored CORESET may be used for the non-overlapped symbols of this CORESET in the time domain.

In some of the present implementations, the QCL assumption of the non-monitored CORESET may be used as a beam indication, a QCL indication, or being part of a QCL chain.

Case 1.4.2

In Case 1.4.2, the UE may release or suspend the QCL assumption of the non-monitored CORESET. An example of the UE's operation is described below:

For a UE that monitors multiple search spaces associated with different CORESETs, for a single cell operation or for an operation with CA in the same frequency band,
- if the monitoring occasions of the search spaces are overlapped in the time domain and one or more search space(s) are not monitored by the UE,
  - the UE may release the QCL assumption for the non-monitored CORESET(s) and for the non-overlapped CORESET(s) related to this search space, or
  - the UE may suspend the QCL assumption for the slots in which the CORESETs are overlapped and non-monitored by the UE, but keep the QCL assumption for the non-overlapped CORESETs in the same search space, or
  - the UE may release or suspend the QCL assumption for the overlapped parts of the non-monitored CORESET(s), but keep using the configured QCL assumptions for the non-overlapped parts of the CORESETs (e.g., within one or two OFDM symbols).

Option #3

In this option, the UE may override the QCL assumption of the non-monitored CORESET by another QCL assumption. An example of the UE's operation is described below:

For a UE that monitors multiple search spaces associated with different CORESETs, for a single cell operation or for an operation with CA in the same frequency band,
- if the monitoring occasions of the search spaces are overlapped in the time domain and one or more search spaces are not monitored by the UE,
  - the UE may override the QCL assumption for the non-monitored CORESET(s) by the monitored CORESET.

In some of the present implementations, the QCL assumption of the non-monitored CORESET may only be overridden in the overlapped symbols of the non-monitored CORESET.

In some other implementations, the QCL assumption of the non-monitored CORESET(s) may be overridden in the whole-time interval of the non-monitored CORESET.

Non-Selected Coreset for Radio Link Monitor (RLM) RS Selection

In some implementations, an RLM RS selection process for a UE is described as follows:
- the UE is not required to use an aperiodic or semi-persistent RS for radio link monitoring, and
- the UE selects $N_{RLM}$ RS(s) provided for the active TCI states for a PDCCH reception in the CORESET(s) associated with the search space(s) with the shortest monitoring periodicity, and
- if multiple CORESETs are associated with the search space(s) with the same periodicity, the UE may select the CORESET(s) with the highest CORESET ID.

Figure 2:
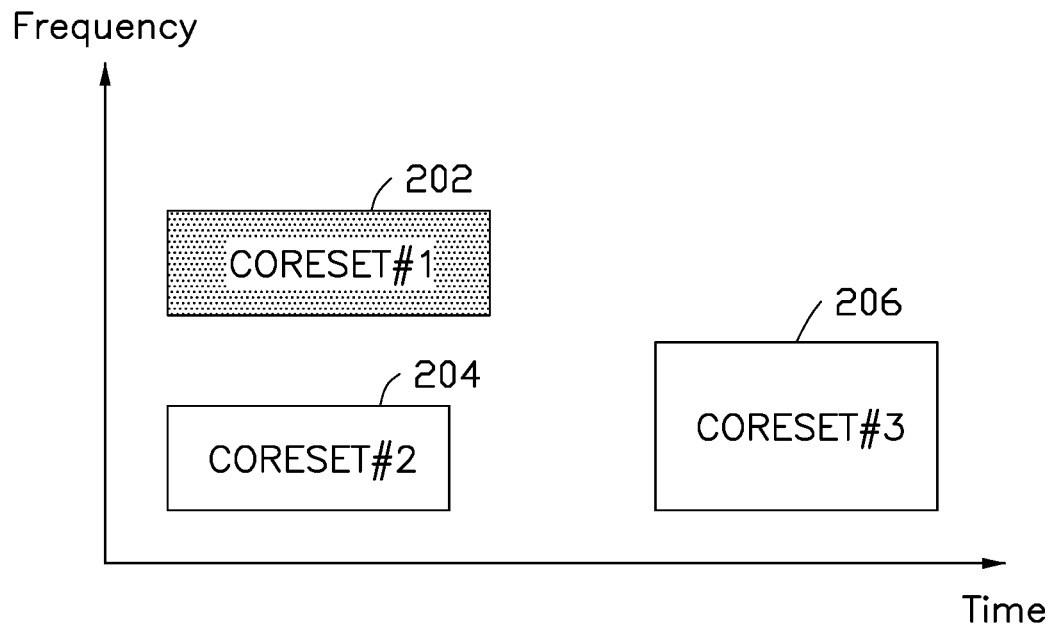
FIG. 2 is a schematic diagram illustrating multiple CORESETs configured for a UE, in accordance with an example implementation of the present disclosure.

FIG. 2 is a schematic diagram illustrating multiple CORESETs configured for a UE, in accordance with example implementations of the present disclosure. As shown in FIG. 2, the UE is configured with CORESET #1 202, CORESET #2 204, and CORESET #3 206, where CORESET #1 202 overlaps CORESET #2 204 in at least one symbol in the time domain.

Assuming that CORESET #1 202 has a higher CORESET ID than the overlapped CORESET #2 204, the above-described RLM RS selection process may be ambiguous in a case that CORESET #2 204 is not monitored by the UE.

In view of this issue, some of the present implementations provide methods to improve the UE's behavior for the RLM RS selection process.

Case 2.1

In this case, the UE may select the CORESET(s) with the lowest CORESET ID to monitor when there are multiple CORESETs configured to the UE. An example RLM RS selection process is described below:
- the UE is not required to use an aperiodic or semi-persistent RS for radio link monitoring, and
- the UE selects $N_{RLM}$ RS provided for the active TCI states for a PDCCH reception in the CORESET(s) associated with the search space(s) with the shortest monitoring periodicity, and
- if multiple CORESETs are associated with the search space(s) with the same periodicity, the UE may select the CORESET(s) with the lowest CORESET ID containing an active TCI-state to monitor.

Case 2.2

In this case, to avoid a case that there are no TCI states (or TCI states are not valid) for selection, the selected CORESET(s) may be monitored by the UE and be configured with TCI state(s) during the RLM RS selection process.

Non-Monitored CORESET For A Default Aperiodic CSI-RS Beam

In some implementations, if there is no PDSCH transmitted in the same symbols as the aperiodic CSI-RS, the default QCL assumption of the aperiodic CSI-RS may be derived from the CORESET with the lowest CORESET ID. An example process applied by a UE for determining a default QCL assumption is described below:
- after the UE successfully decodes the DCI scheduling a PDSCH, if there is only PDSCH(s) transmitted in the same symbols as the CSI-RS, the default QCL assumption of the aperiodic CSI-RS may follow the QCL assumption of the PDSCH (assuming that the scheduling offset between the reception of DCI and the PDSCH is larger than, or equal to, a threshold), and
- if there is no PDSCH transmitted in the same symbols as the CSI-RS, the default QCL assumption of the aperiodic CSI-RS may be derived from the CORESET with the lowest CORESET ID.

As described above, the CORESET with the lowest CORESET ID may be a non-monitored CORESET. If the non-monitored CORESET is used for a beam indication, an unfavorable beam switching may happen, as shown in FIG. 3.

Figure 3:
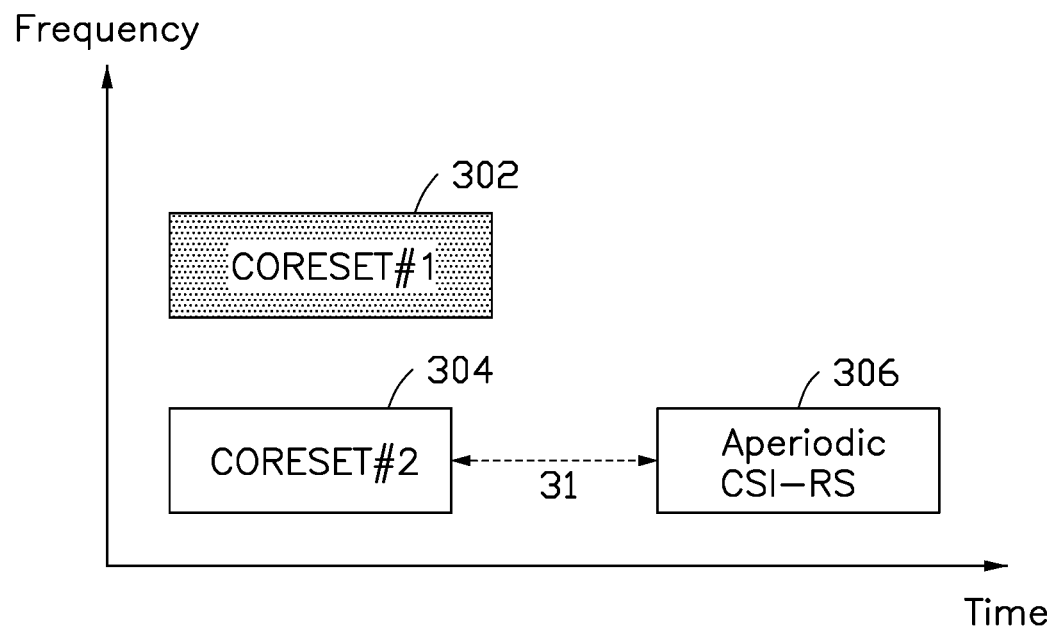
FIG. 3 is a schematic diagram illustrating multiple CORESETs configured for a UE, in accordance with an example implementation of the present disclosure.

FIG. 3 is a schematic diagram illustrating multiple CORESETs configured for a UE, in accordance with example implementations of the present disclosure. As show in FIG. 3, the UE is configured with two CORESETs, CORESET #1 302 and CORESET #2 304, overlapping in at least one symbol in the time domain. In addition, the UE may receive DCI from CORESET #2 304 to transmit the aperiodic CSI-RS in resource 306.

Assuming that CORESET #1 302 has the lowest CORESET ID and is not monitored by the UE, based on the above-described process, CORESET #1 302 may be used for the beam indication (or QCL assumption) for receiving resource 306 carrying the aperiodic CSI-RS when the scheduling offset 31 between the reception of the DCI in CORESET #2 304 and the resource 306 is less than a threshold (e.g., Threshold-Sched-Offset), but this may result in an unfavorable beam switching.

In view of this issue, in some of the present implementations, the CORESET with the lowest CORESET ID may be expected to be monitored by the UE and contain at least one activated TCI state.

Figure 4:
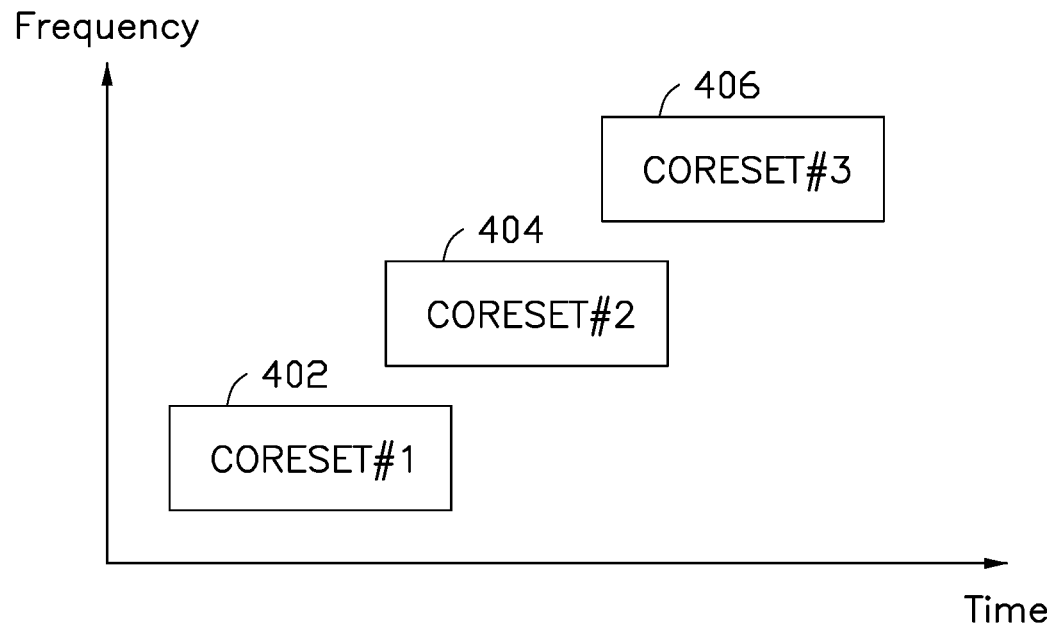
FIG. 4 is a schematic diagram illustrating multiple CORESETs configured for a UE, in accordance with an example implementation of the present disclosure.

FIG. 4 is a schematic diagram illustrating multiple CORESETs configured for a UE, in accordance with example implementations of the present disclosure. As shown in FIG. 4, the UE is configured with CORESET #1 402, CORESET #2 404 and CORESET #3 406. CORESET #1 402 may overlap CORESET #2 404 in at least one symbol in the time domain, and CORESET #2 404 may further overlap CORESET #3 406 in at least one symbol in the time domain.

In this example implementation, the UE may monitor CORESET #1 402 only, or monitor both of CORESET #1 402 and CORESET #3 406 simultaneously. If the UE monitors CORESET #1 402 and CORESET #3 406, then CORESET #2 404 may be the only non-monitored CORESET, and its QCL assumption for the beam indication may follow the processes described in the present disclosure. By contrast, if the UE only monitors CORESET #1 402, then both CORESET #2 404 and CORESET #3 406 may become overlapped non-monitored CORESETs, and their QCL assumptions for the beam indication may either remain the same spatial QCLs, or be overridden by the non-monitored CORESET with the lowest CORESET ID.

Deprioritized PDSCH

In some implementations, the reception of a PDSCH may be deprioritized when the PDSCH overlaps one or more CORESETs in the time domain. This PDSCH may be referred to as a deprioritized PDSCH, which means that the level of priority for receiving this PDSCH may be reduced.

Figure 5:
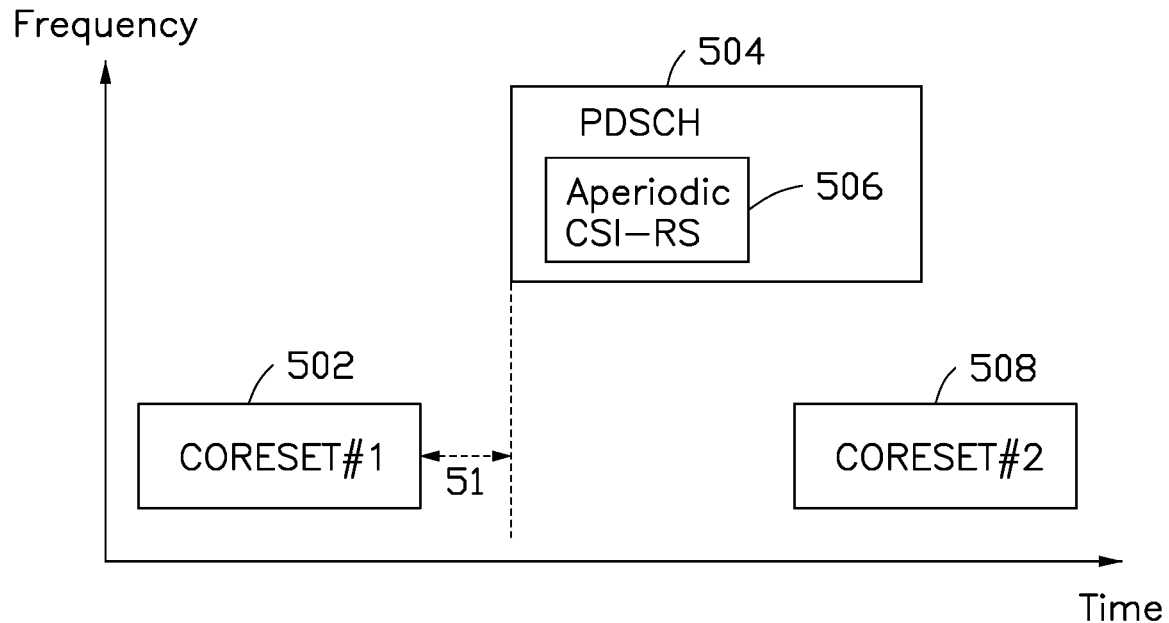
FIG. 5 is a schematic diagram illustrating a PDSCH overlapping a CORESET in the time domain, in accordance with an example implementation of the present disclosure.

FIG. 5 is a schematic diagram illustrating a PDSCH overlapping a CORESET in the time domain, in accordance with example implementations of the present disclosure. As shown in FIG. 5, the UE may receive DCI in CORESET #1 502 to schedule PDSCH 504 that overlaps CORESET #2 508 in the time domain. In this example implementation, PDSCH 504 may contain resource 506 carrying an aperiodic CSI-RS that does not overlap CORESET #2 508 in the time domain. The location of resource 506 may be scheduled or determined by the DCI obtained from CORESET #1 502. The scheduling offset 51 may be a time interval between the end of the last symbol of the PDCCH carrying the DCI (in CORESET #1 502) and the beginning of the first symbol of PDSCH 504. In this example implementation, the scheduling offset 51 may be less than a threshold (e.g., Threshold-Sched-Offset).

In some of the present implementations, all CORESETs configured to the UE (e.g., CORESET #1 502 and CORESET #2 508) and the resource carrying the aperiodic CSI-RS (e.g., resource 506 in FIG. 5) may be provided in a time slot in an active BWP of a serving cell.

In some implementations of the present implementation, CORESET #2 508 may be a non-monitored CORESET associated with a non-monitored search space configured to the UE.

Techniques for determining the QCL assumption for PDSCH 504 or resource 506 carrying the aperiodic CSI-RS are described below.

Case 3.1

In this case, the QCL assumption of PDSCH 504 may follow the QCL assumption of CORESET #2 508 that overlaps PDSCH 504 in at least one symbol in the time domain. For example, the UE may assume that the DM-RS ports of PDSCH 504 are quasi co-located with the RS(s) indicated in the TCI state with respect to the QCL assumption(s) used for the PDCCH QCL indication (e.g., corresponding to CORESET #2 508) with the lowest CORESET ID in the latest slot in which one or more CORESETs within the active BWP of the serving cell are configured for the UE.

This case may also be applied to the intra-band CA case (in which the PDSCH and the CORESET are in different CCs).

Case 3.2

In this case, after a successful decoding of the DCI scheduling PDSCH 504, if only PDSCH 504 is transmitted in the same symbols as resource 506 having the aperiodic CSI-RS, the default QCL assumption for the aperiodic CSI-RS resource 506 may follow the QCL assumption of PDSCH 504, even if the reception of PDSCH 504 is deprioritized because of being overlapped with CORESET #2 508 in at least one OFDM symbol in the time domain.

In some of such implementations, if there are multiple QCL assumptions for a single PDSCH in the time domain over at least one OFDM symbol, the aperiodic CSI RS may follow the same QCL assumption(s) as the aligned PDSCH symbols.

Case 3.3

Currently, there is no clear wording on a deprioritized PDSCH whether its QCL assumption should be maintained, invalidated, or overridden by the overlapped CORESET. Example solutions for this issue are described below.

Case 3.3.1

In Case 3.3.1, the UE may store and maintain the QCL assumption of the deprioritized PDSCH (e.g., PDSCH 504), if the QCL assumption (e.g., QCL-TypeD parameters) of the DMRSs of this PDSCH is different from the DMRSs of the PDCCH (e.g., in CORESET #2 508 shown in FIG. 5) overlapping the PDSCH in at least one symbol in the time domain. The UE may be expected to prioritize the reception of the PDCCH associated with that CORESET (e.g., CORESET #2 508). In some of the present implementations, the QCL assumption of the deprioritized PDSCH may still be used for this PDSCH if the UE supports multiple RX beams. In some other implementations, the QCL assumption of the deprioritized PDSCH may be used for the non-overlapped portion with CORESET #2 508. In some other implementations, the QCL assumption may be used for beam indication purposes or for building a QCL chain.

Case 3.3.2

In Case 3.3.2, the UE may release, or partially release, the QCL assumption of the deprioritized PDSCH (e.g., PDSCH 504), if the QCL assumption (e.g., QCL-TypeD parameters) of the DMRSs of this PDSCH is different from the DMRSs of the PDCCH (e.g., in CORESET #2 508) overlapping the PDSCH in at least one symbol in the time domain. The UE may be expected to prioritize the reception of the PDCCH associated with that CORESET (e.g., CORESET #2 508). For example, the UE may release the QCL assumption of PDSCH 504 only for the overlapped portion with CORESET #2 508 in the time domain, while maintaining this QCL assumption for the non-overlapped portion.

Case 3.3.3

In Case 3.3.3, the UE may override the QCL assumption of the deprioritized PDSCH (e.g., PDSCH 504) by an overlapped monitored CORESET (e.g., CORESET #1 502), if the QCL assumption (e.g., QCL-TypeD parameters) of the DMRSs of this PDSCH is different from the DMRSs of the PDCCH (e.g., in CORESET #2 508) overlapping the PDSCH in at least one symbol in the time domain. The UE may be expected to prioritize the reception of the PDCCH associated with that CORESET.

In some of the present implementations, if two or more CORESETs are chosen, the UE may select the CORESET with the lowest CORESET ID to override the QCL assumption of the deprioritized PDSCH. In some of the present implementations, the UE may overwrite the QCL assumption of the deprioritized PDSCH only for the overlapped portion with the CORESET(s) in the time domain while maintaining this QCL assumption for the non-overlapped portion.

Deprioritized PDSCH for Overlapped Aperiodic CSI-RS and CORESET

Figure 6:
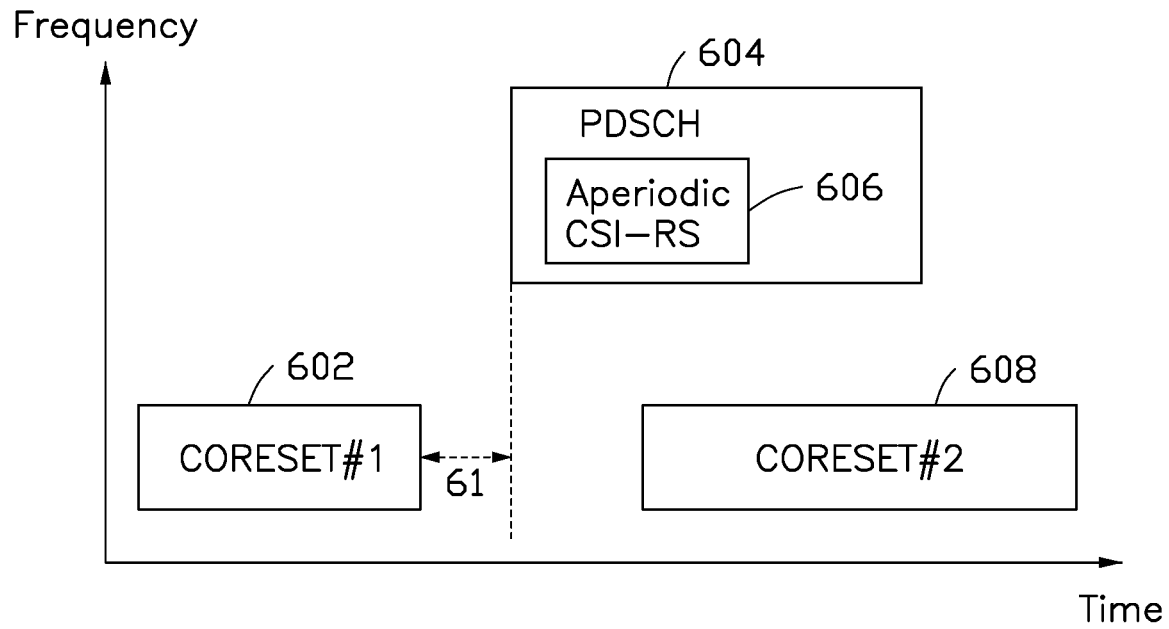
FIG. 6 is a schematic diagram illustrating that an aperiodic CSI-RS, a PDSCH, and a CORESET are overlapped in the time domain, in accordance with an example implementation of the present disclosure.

FIG. 6 is a schematic diagram illustrating that an aperiodic CSI-RS, a PDSCH, and a CORESET are overlapped in the time domain, in accordance with example implementations of the present disclosure. As shown in FIG. 6, the UE may receive DCI in CORESET #1 602 to schedule PDSCH 604 that overlaps CORESET #2 608 in the time domain. Similar to FIG. 5, PDSCH 604 may also contain resource 606 carrying an aperiodic CSI-RS, but resource 606 overlaps CORESET #2 608 in the time domain. In addition, the scheduling offset 61 may be a time interval between the end of last symbol of the PDCCH carrying the DCI (in CORESET #1 602) and the beginning of the first symbol of PDSCH 604. In this example implementation, the scheduling offset 61 may be less than a threshold (e.g., Threshold-Sched-Offset).

In some of the present implementations, the UE may apply the QCL assumption of the monitored and prioritized CORESET (e.g., CORESET #2 608) as a default beam for the reception of the aperiodic CSI-RS resource (e.g., resource 606). In some implementations, both the overlapped and non-overlapped portions of the symbols of the aperiodic CSI-RS in resource 606 may use the same QCL assumption. In some other implementations, only the overlapped portions of the aperiodic CSI-RS in resource 606 may use the same QCL assumption as the overlapped CORESET #2 608, and the non-overlapped portions of the aperiodic CSI-RS in resource 606 may keep using the original QCL configuration.

Deprioritized PDSCH for Non-Monitored CORESET(s)

As described above, if the QCL assumption (e.g., QCL-TypeD) of the PDSCH DMRSs is different from that of the PDCCH DMRSs with which they overlap in at least one symbol in the time domain, the UE may be expected to prioritize the reception of the PDCCH associated with that CORESET over the PDSCH.

Figure 7:
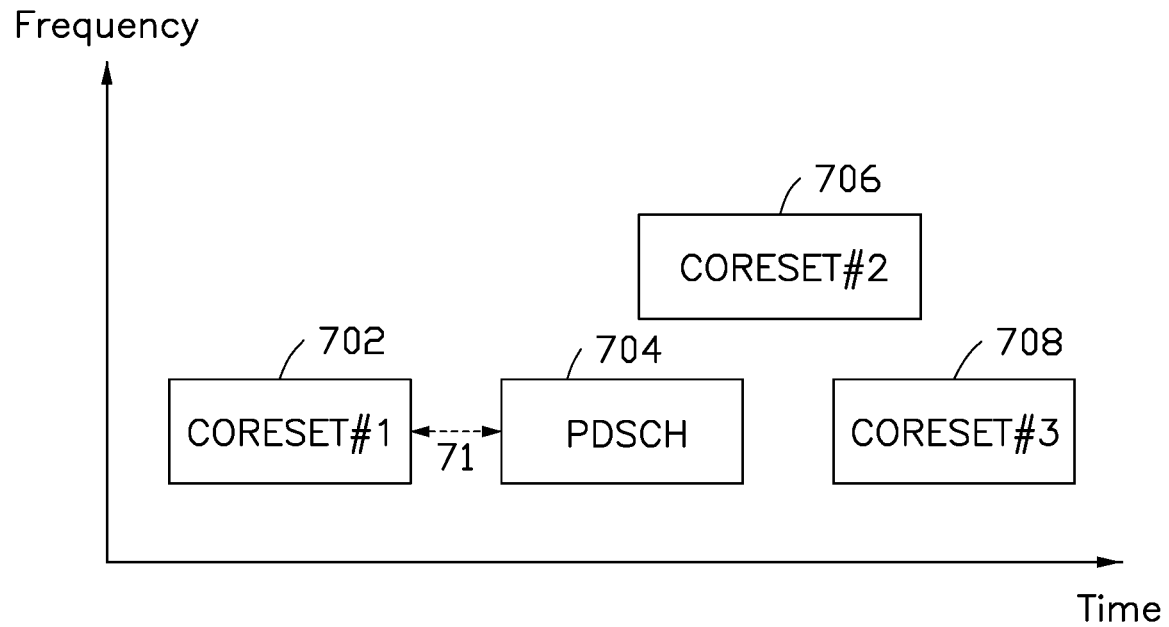
FIG. 7 is a schematic diagram illustrating multiple CORESETs configured for a UE, in accordance with an example implementation of the present disclosure.

However, if that CORESET is not monitored by the UE (e.g., due to accidentally overlapping with other CORESETs), the UE's behavior may be unclear because the UE may not know whether to prioritize the QCL assumption for the non-monitored CORESET, as illustrated in FIG. 7.

FIG. 7 is a schematic diagram illustrating multiple CORESETs configured for a UE, in accordance with example implementations of the present disclosure. In the example implementation, the UE may receive DCI from CORESET #1 702 to schedule PDSCH 704 that overlaps CORESET #2 706 in the time domain, where CORESET #2 706 and CORESET #3 708 are overlapped in at least one symbol in the time domain with different QCL assumptions. In addition, CORESET #3 is monitored by the UE, and while CORESET #2 is not monitored. As described above, it may be unclear whether the reception of PDSCH 704 should change its QCL assumption for the non-monitored and overlapped CORESET #2 706.

In view of this issue, techniques for determining the QCL assumption for the PDSCH that overlaps CORESET(s) are described below.

Case 4.1

In this case, the PDSCH may have the same QCL assumption as the overlapped non-monitored CORESET. For example, in FIG. 7, the QCL assumption of PDSCH 704 may follow the QCL assumption of the overlapped non-monitored CORESET #2 706, if the scheduling offset 71 between the reception of the DCI and the corresponding PDSCH 704 is less than a threshold (e.g., Threshold-Sched-Offset). This case may also apply to the intra-band CA case (e.g., the PDSCH and the overlapped CORESET are in different CCs).

Case 4.2

Figure 8:
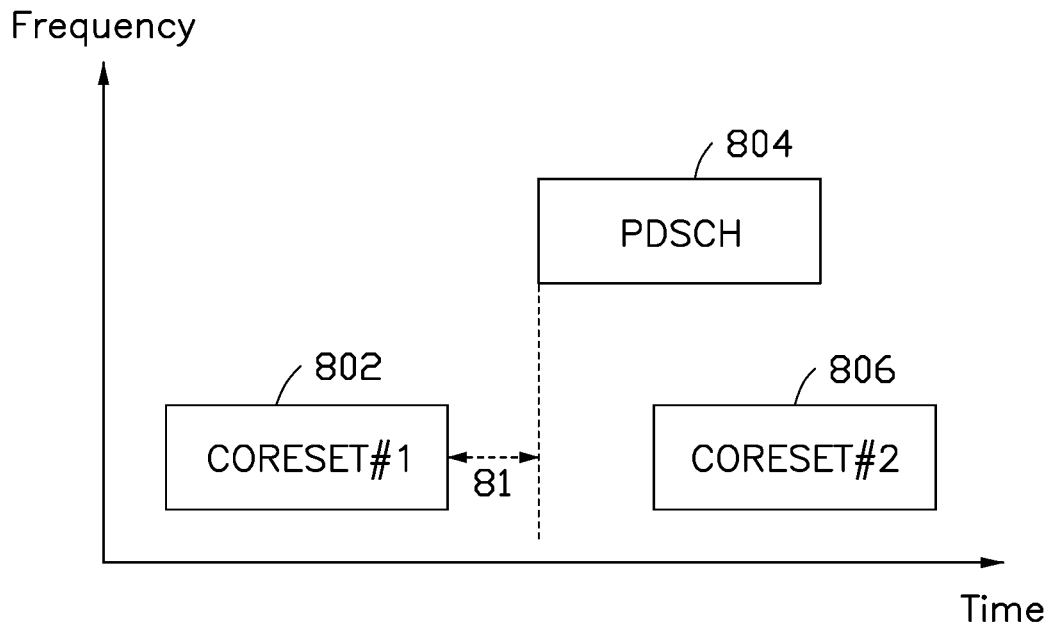
FIG. 8 is a schematic diagram illustrating multiple CORESETs configured for a UE, in accordance with an example implementation of the present disclosure.

FIG. 8 is a schematic diagram illustrating multiple CORESETs configured for a UE, in accordance with example implementations of the present disclosure. In the example implementation, the UE may receive DCI from CORESET #1 802 to schedule PDSCH 804 that overlaps CORESET #2 806 in the time domain. In addition, CORESET #2 806 is monitored by the UE.

In this case, if the scheduling offset 81 between the reception of the DCI and the corresponding PDSCH 804 is less than a threshold (e.g., Threshold-Sched-Offset), and the QCL assumption of the DMRSs of PDSCH 804 is different from the overlapped monitored PDCCH (in CORESET #2 806), the UE may be expected to prioritize the reception of monitored PDCCH associated with that CORESET (e.g., CORESET #2 806). This case may also apply to the intra-band CA case (e.g., the PDSCH and the CORESET are in different CCs).

Figure 9:
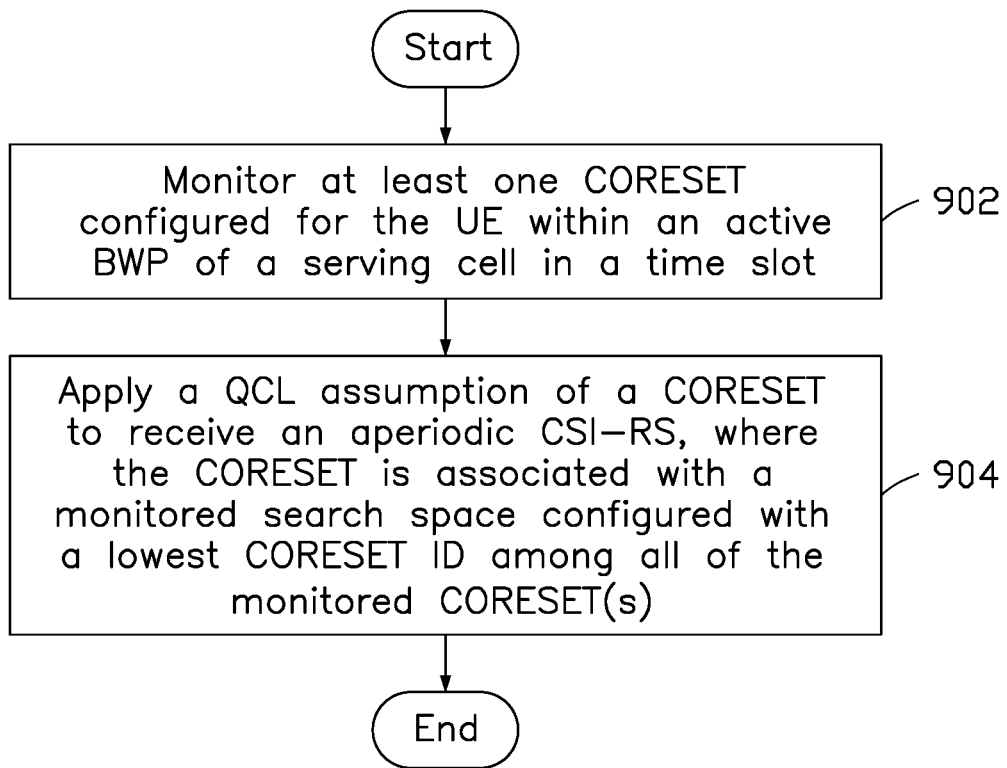
FIG. 9 is a flowchart for a method of determining QCL assumptions in a wireless communication system, in accordance with an example implementation of the present disclosure.

FIG. 9 is a flowchart for a method of determining QCL assumptions in a wireless communication system, in accordance with an example implementation of the present disclosure. In action 902, a UE may monitor at least one of multiple CORESETs configured for the UE within an active BWP of a serving cell in a time slot. In action 904, the UE may apply a QCL assumption of a CORESET to receive an aperiodic CSI-RS. The CORESET may be associated with a monitored search space configured with the lowest CORESET ID among the monitored CORESET(s).

In some of the present implementations, the UE may monitor at least one of multiple CORESETs configured for the UE within an active BWP of a serving cell in a time slot. In addition, the UE may receive DCI scheduling a PDSCH from a PDCCH and apply a QCL assumption for reception of the PDCCH to receive the PDSCH, when a scheduling offset between an end of a last symbol of the PDCCH carrying the DCI and a beginning of a first symbol of the PDSCH is less than a threshold. The above-described PDCCH may be transmitted in one of a set of one or more monitored CORESETs, where this monitored CORESET (in which the PDCCH is transmitted) may be associated with a monitored search space configured with a lowest CORESET ID among the monitored CORESET(s).

Figure 10:
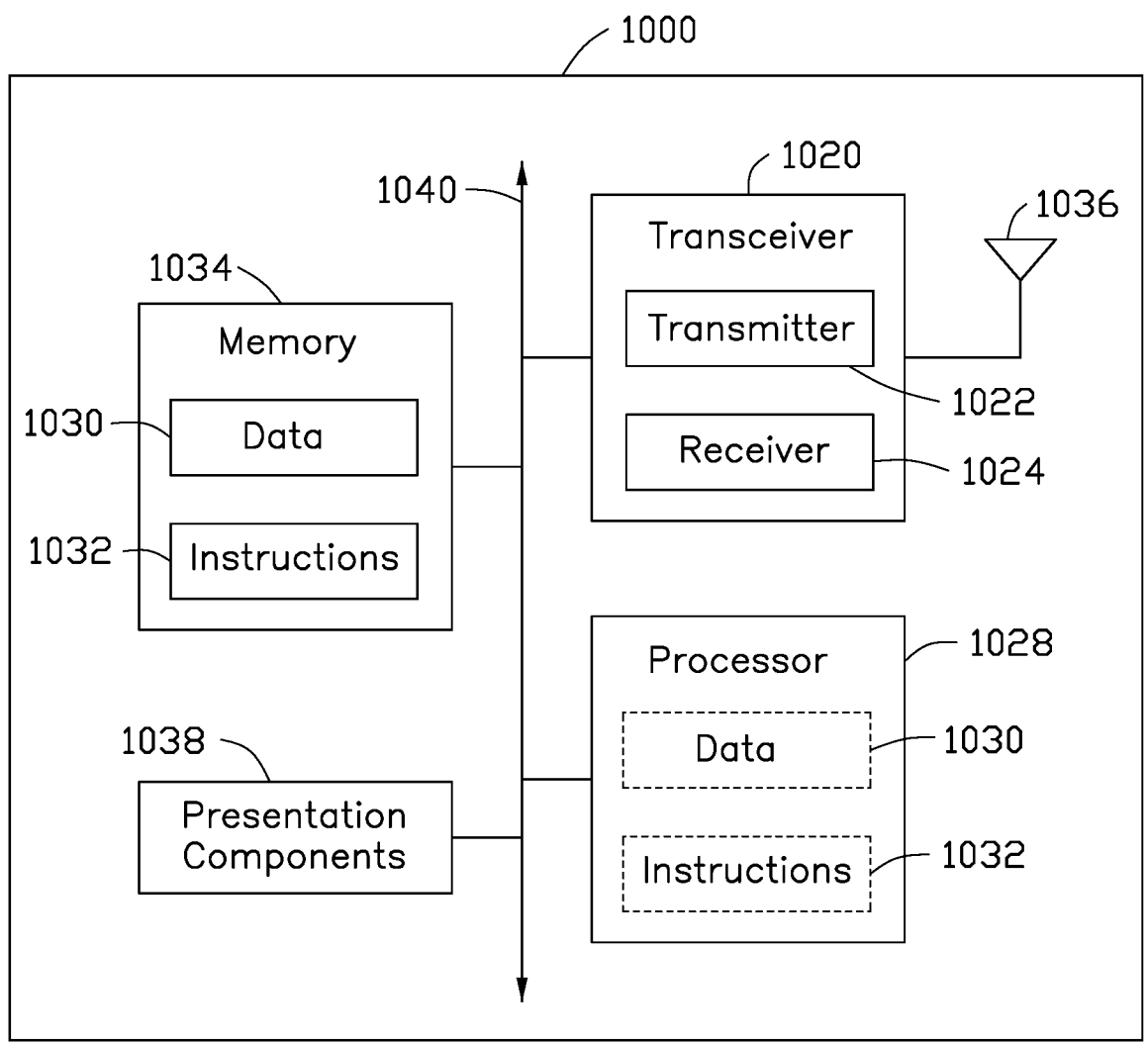
FIG. 10 is a block diagram illustrating a node for wireless communication, in accordance with various aspects of the present disclosure.

FIG. 10 is a block diagram illustrating a node for wireless communication, in accordance with various aspects of the present disclosure. As shown in FIG. 10, a node 1000 may include a transceiver 1020, a processor 1028, a memory 1034, one or more presentation components 1038, and at least one antenna 1036. The node 1000 may also include an RF spectrum band module, a BS communications module, a network communications module, and a system communications management module, Input/Output (I/O) ports, I/O components, and power supply (not explicitly shown in FIG. 10). Each of these components may be in communication with each other, directly or indirectly, over one or more buses 1040. In one implementation, the node 1000 may be a UE or a BS that performs various functions described herein, for example, with reference to FIGS. 1 through 9.

The transceiver 1020 having a transmitter 1022 (e.g., transmitting/transmission circuitry) and a receiver 1024 (e.g., receiving/reception circuitry) may be configured to transmit and/or receive time and/or frequency resource partitioning information. In some implementations, the transceiver 1020 may be configured to transmit in different types of subframes and slots including, but not limited to, usable, non-usable and flexibly usable subframes and slot formats. The transceiver 1020 may be configured to receive data and control channels.

The node 1000 may include a variety of computer-readable media. Computer-readable media may be any available media that may be accessed by the node 1000 and include both volatile and non-volatile media, removable and non-removable media. By way of example, and not limitation, computer-readable media may comprise computer storage media and communication media. Computer storage media includes both volatile and non-volatile, removable and non-removable media implemented in any method or technology for storage of information such as computer-readable instructions, data structures, program modules or data.

Computer storage media includes RAM, ROM, EEPROM, flash memory or other memory technology, CD-ROM, Digital Versatile Disks (DVD) or other optical disk storage, magnetic cassettes, magnetic tape, magnetic disk storage or other magnetic storage devices. Computer storage media does not comprise a propagated data signal. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The memory 1034 may include computer-storage media in the form of volatile and/or non-volatile memory. The memory 1034 may be removable, non-removable, or a combination thereof. Example memory includes solid-state memory, hard drives, optical-disc drives, and etc. As illustrated in FIG. 10, The memory 1034 may store computer-readable, computer-executable instructions 1032 (e.g., software codes) that are configured to, when executed, cause the processor 1028 to perform various functions described herein, for example, with reference to FIGS. 1 through 9. Alternatively, the instructions 1032 may not be directly executable by the processor 1028 but be configured to cause the node 1000 (e.g., when compiled and executed) to perform various functions described herein.

The processor 1028 (e.g., having processing circuitry) may include an intelligent hardware device, e.g., a Central Processing Unit (CPU), a microcontroller, an ASIC, and etc. The processor 1028 may include memory. The processor 1028 may process the data 1030 and the instructions 1032 received from the memory 1034, and information through the transceiver 1020, the base band communications module, and/or the network communications module. The processor 1028 may also process information to be sent to the transceiver 1020 for transmission through the antenna 1036, to the network communications module for transmission to a core network.

One or more presentation components 1038 presents data indications to a person or other device. Examples of presentation components 1038 may include a display device, speaker, printing component, vibrating component, etc.

From the above description, it is manifested that various techniques may be used for implementing the concepts described in the present application without departing from the scope of those concepts. Moreover, while the concepts have been described with specific reference to certain implementations, a person of ordinary skill in the art may recognize that changes may be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

What is claimed is:

1. A user equipment (UE) for performing beam operations, the UE comprising:
   one or more non-transitory computer-readable media having computer-executable instructions embodied thereon; and
   at least one processor coupled to the one or more non-transitory computer-readable media, and configured to execute the computer-executable instructions to:
   monitor at least one of a plurality of Control Resource Sets (CORESETs) configured for the UE within an active Bandwidth Part (BWP) of a serving cell in a time slot;
   receive Downlink Control Information (DCI) scheduling a Downlink (DL) Reference Signal (RS), wherein a scheduling offset between an end of a last symbol of a Physical Downlink Control Channel (PDCCH) carrying the DCI and a beginning of a first symbol of a resource carrying the DL RS is less than a threshold; and
   apply a first Quasi Co-Location (QCL) assumption of a first CORESET of a set of one or more of the monitored at least one of a plurality of CORESETs to receive a DL RS,
   wherein the first CORESET is associated with a monitored search space configured with a lowest CORESET Identity (ID) among the set of one or more of the monitored at least one of the plurality of CORESETs.

2. The UE of claim 1, wherein the first CORESET overlaps a non-monitored second CORESET of the plurality of CORESETs in a time domain, the non-monitored second CORESET associated with a non-monitored search space configured to the UE.

3. The UE of claim 2, wherein:
the monitored search space is configured with a first search space ID,
the non-monitored search space is configured with a second search space ID, and
a value of the first search space ID is smaller than a value of the second search space ID.

4. The UE of claim 2, wherein the second CORESET is configured on one of a deactivated BWP and a deactivated Secondary Cell (SCell).

5. The UE of claim 2, wherein the second CORESET overlaps a third CORESET of the set of one or more of the monitored at least one of the plurality of CORESETs in the time domain.

6. The UE of claim 1, wherein the plurality of CORESETs and a resource carrying the DL RS are provided in the time slot and the active BWP of the serving cell.

7. The UE of claim 1, wherein the at least one processor is further configured to execute the computer-executable instructions to:
obtain, from the first CORESET, DCI scheduling a Physical Downlink Shared Channel (PDSCH); and
apply a second QCL assumption of a second CORESET to receive the PDSCH when a scheduling offset between an end of a last symbol of a PDCCH carrying the DCI and a beginning of a first symbol of the PDSCH is less than a threshold, wherein the second CORESET overlaps the PDSCH in a time domain.

8. The UE of claim 7, wherein the second CORESET is a non-monitored CORESET in the plurality of CORESETs, the non-monitored CORESET associated with a non-monitored search space configured to the UE.

9. A method performed by a user equipment (UE) for beam operations, the method comprising:
monitoring at least one of a plurality of Control Resource Sets (CORESETs) configured for the UE within an active Bandwidth Part (BWP) of a serving cell in a time slot;
obtaining Downlink Control Information (DCI) scheduling a Downlink (DL) Reference Signal (RS), from the first CORESET, wherein a scheduling offset between an end of a last symbol of a Physical Downlink Control Channel (PDCCH) carrying the DCI and a beginning of a first symbol of a resource carrying the DL RS is less than a threshold; and
applying a first Quasi Co-Location (QCL) assumption of a first CORESET of a set of one or more of the monitored at least one of the plurality of CORESETs to receive a DL RS,
wherein the first CORESET is associated with a monitored search space configured with a lowest CORESET Identity (ID) among the set of one or more of the monitored at least one of the plurality of CORESETs.

10. The method of claim 9, wherein the first CORESET overlaps a non-monitored second CORESET of the plurality of CORESETs in a time domain, the non-monitored second CORESET associated with a non-monitored search space configured to the UE.

11. The method of claim 10, wherein:
the monitored search space is configured with a first search space ID,
the non-monitored search space is configured with a second search space ID, and
a value of the first search space ID is smaller than a value of the second search space ID.

12. The method of claim 10, wherein the second CORESET is configured on one of a deactivated BWP and a deactivated Secondary Cell (SCell).

13. The method of claim 10, wherein the second CORESET overlaps a third CORESET of the set of CORESETs in the time domain.

14. The method of claim 9, wherein the plurality of CORESETs and a resource carrying the DL RS are provided in the time slot and the active BWP of the serving cell.

15. The method of claim 9, further comprising:
Obtaining DCI scheduling a Physical Downlink Shared Channel (PDSCH) from the first CORESET; and
applying a second QCL assumption of a second CORESET to receive the PDSCH when a scheduling offset between an end of a last symbol of a PDCCH carrying the DCI and a beginning of a first symbol of the PDSCH is less than a threshold, wherein the second CORESET overlaps the PDSCH in time domain.

16. The method of claim 15, wherein the second CORESET is a non-monitored CORESET in the plurality of CORESETs, the non-monitored CORESET associated with a non-monitored search space configured to the UE.

* * * * *